(No Model.)
P. H. FARREY.
PIPE COUPLING.
No. 546,314.  Patented Sept. 17, 1895.
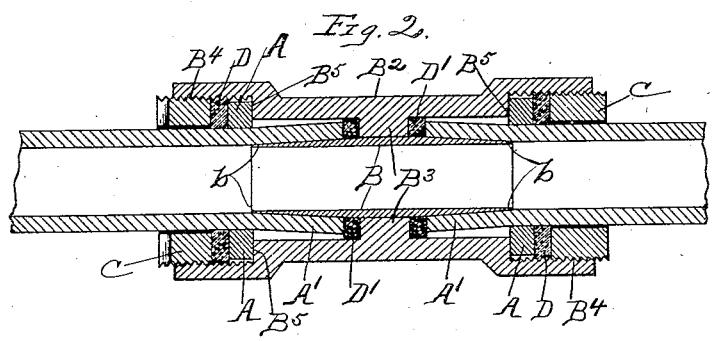
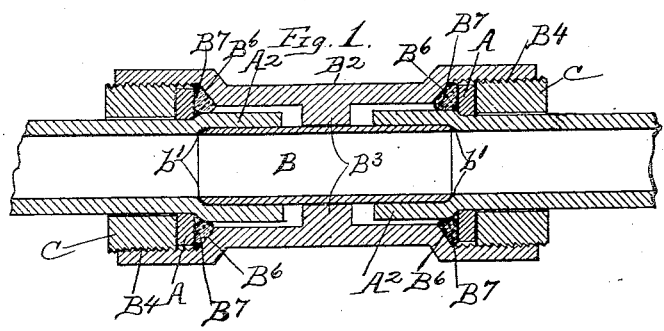
Witnesses:
J. G. Curtis
G. L. Curtis
Inventor:
Philip H. Farrey
By Mosher & Curtis
Attys.

UNITED STATES PATENT OFFICE.

PHILIP H. FARREY, OF AMSTERDAM, NEW YORK.

PIPE-COUPLING.

SPECIFICATION forming part of Letters Patent No. 546,314, dated September 17, 1895.

Application filed October 29, 1894. Serial No. 527,184. (No model.)

*To all whom it may concern:*

Be it known that I, PHILIP H. FARREY, a citizen of the United States, residing at Amsterdam, county of Montgomery, and State of New York, have invented certain new and useful Improvements in Pipe-Couplings, of which the following is a specification.

The invention relates to such improvements; and it consists of the novel construction and combination of parts hereinafter described and subsequently claimed.

Reference may be had to the accompanying drawings and the letters of reference marked thereon, which form a part of this specification.

Similar letters refer to similar parts in both figures therein.

Figure 1 of the drawings is a central longitudinal section of my improved coupling. Fig. 2 is a similar view of a modified form of my improved coupling.

The object of my invention is to produce a detachable coupling and avoid the use of solder or hammered packing.

In carrying out my invention a metallic retaining-ring A is first slipped onto the end portion of each pipe $A^2$ to a position a short distance from the extreme end of the pipe. The interior diameter of the ring is approximately the same as the exterior diameter of the inclosed pipe. The pipe, which is made of lead, is then expanded by a tool in the usual or any known manner, so as to form an offset on the pipe between its end and the ring, as shown. The expanded ends of the pipes are then connected by a coupling-tube B, having its ends inserted in the respective pipes, and the sleeve $B^2$, the ends of which respectively inclose the ends of the pipes, including the rings A thereon. At $b'$ the end of the lead pipe is offset abruptly, forming a prominent flange or shoulder against which the ring bears. The sleeve is provided midway of its length with the inner annular flange $B^3$, adapted to receive and fit the coupling-tube. The sleeve has its ends screw-threaded interiorly, as shown at $B^4$, and is provided at the inner end of its threaded portions with a seat for the retaining-ring A. At $B^6$ the seat is shown beveled, and a packing-ring $B^7$ is interposed between the ring and seat. To bind and lock the parts together I insert the locking-nuts C, exteriorly screw-threaded to fit the screw-threaded portions of the sleeve and previously slipped onto the ends of the respective pipes, in the ends of the sleeve, and by means of the screw-threads force the nuts into engagement with the retaining-rings A, thereby forcing the ends of the lead pipes into the sleeve and onto the coupling-tube and making a tight joint between the relatively movable parts.

The packing-ring $B^7$ may be of any desired cross-sectional form. Good results are obtained when the normal cross-sectional form of the ring is circular. The pressure upon such ring produces a flattened surface in engagement with the inclined seat on the sleeve and also in engagement with the exterior surface of the inclosed pipe, as shown in Fig. 1. The length of the pipe end from its retaining-ring is such that the pipe will not engage the inner middle flange of the sleeve.

By unscrewing the locking-nuts I can easily uncouple the pipes to remove any obstruction therefrom and again couple them, as above described. I am thus able to cheaply produce a detachable coupling which can be easily and quickly operated without solder or hammered packing.

The coupling-tube is tightly secured within the inner middle flange $B^3$ in any known manner, as by shrinking the sleeve thereon or by driving the tube within the flange $B^3$, in either case forming a permanent connection between the sleeve and tube. As thus constructed, the tube is supported by the sleeve and cannot be misplaced in the operation of coupling the pipes together, whereby either pipe may be coupled or uncoupled independently of the other.

My improved coupling is especially adapted for use with lead pipe, which, being comparatively soft and tractable, is not adapted to be provided with a thread or flange to offer sufficient resistance to the movement of a clamp or follower to form a tight joint; and the inner seats $B^5$ and $B^6$ on the coupling-sleeve have in common the function of limiting or opposing the inward movement of the retaining-ring to form a tight joint between the ring and sleeve independently of the lead pipe.

By forming the coupling-tube of a separate piece and securing it within the coupling-sleeve, as shown, I am able to utilize drawn tubing for the coupling-tube and secure with slight expense a durable and efficient construction.

In Fig. 2 I have shown a modified form of my invention, in which a packing-ring D is interposed between the retaining-ring A on the expanded end of pipe $A^2$ and the locking nuts C, and a packing-ring D' is inserted between the inner expanded end of the lead pipe and the middle inner flange $B^3$ on the coupling-sleeve. At b the end of the coupling-tube is shown tapered and the enlargement of the end of the lead pipe is gradual.

What I claim as new, and desire to secure by Letters Patent, is—

1. In a detachable coupling, the combination with an end-expanded lead-pipe, and retaining ring on the pipe at the junction of the expanded and unexpanded portions, of a coupling-sleeve having a screw-threaded end inclosing the expanded end of the pipe, a coupling-tube formed of a separate piece secured to the coupling-sleeve and inserted in the expanded end of the pipe, and a screw-threaded locking-nut in engagement with the screw-threaded end of the sleeve and engageable with the retaining ring on the pipe, and an inner seat on the sleeve for limiting the inward movement of the retaining ring, substantially as described.

2. In a detachable coupling, the combination with an end-expanded lead pipe, and retaining-ring on the pipe at the junction of the expanded and unexpanded portions, of a coupling-sleeve having a screw-threaded end inclosing the expanded end of the pipe, a coupling-tube secured to the coupling-sleeve and inserted in the expanded end of the pipe, an inner inclined packing-seat on the sleeve, a screw-threaded locking-nut in engagement with the screw-threaded end of the sleeve and engageable with the retaining ring, and a packing-ring interposed between the retaining ring and the inclined packing-seat in the sleeve, substantially as described.

In testimony whereof I have hereunto set my hand this 12th day of October, 1894.

PHILIP H. FARREY.

Witnesses:
RICHARD PICK,
ISAAC JACKSON.